Figure 1:
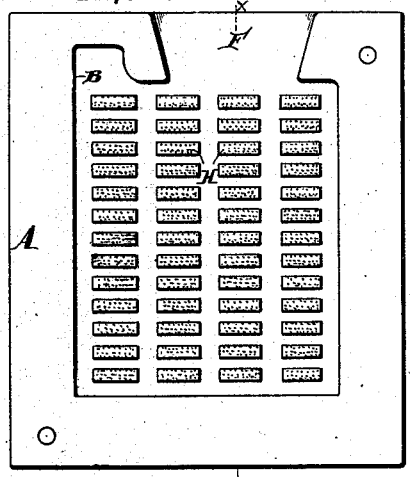

(No Model.)

F. M. LYTE.
SECONDARY BATTERY.

No. 412,639. Patented Oct. 8, 1889.

WITNESSES:
Henry Drury
E. M. Breckinud

INVENTOR:
Farnham M. Lyte
By his atty

UNITED STATES PATENT OFFICE.

FARNHAM MAXWELL LYTE, OF LONDON, COUNTY OF MIDDLESEX, ENGLAND.

SECONDARY BATTERY.

SPECIFICATION forming part of Letters Patent No. 412,639, dated October 8, 1889.

Application filed January 7, 1889. Serial No. 295,677. (No model.) Patented in England July 13, 1883, No. 3,452.

*To all whom it may concern:*

Be it known that I, FARNHAM MAXWELL LYTE, analytical chemist, at present residing at 60 Finborough Road, Redcliffe Square, London, S. W., England, have invented new and useful Improvements in Secondary Batteries or Accumulators, (for which I have obtained Letters Patent in Great Britain, dated July 13, 1883, No. 3,452,) of which the following is a full, clear, and exact description.

This invention relates to secondary batteries or accumulators; and it consists in the peculiar construction of the electrodes, as hereinafter described.

According to my invention I construct a battery in which the active material of the electrode is in the form of a number of studs, prisms, or bars of spongy lead, cylindrical or otherwise, but having flanges, collars, or other projections, or of such form that when embedded in a plate or support (which may be of lead or an alloy of lead or of other conducting material) with their ends or sides projecting from the surface or surfaces thereof they will be retained securely in place; or instead of having collars or projections the studs might be conical, or studs of double cylindro-conical shape truncated at the ends might be used. I may either cast the said compound around the root ends of the studs, prisms, or bars, or that portion of them which is to be embedded in the supporting-plate.

In carrying out my invention I melt and cast the said compound in sand or plaster or other molds in which I have previously arranged at proper distances apart the studs, prisms, or bars or other forms of spongy lead, the portions of said studs, prisms, or bars which are to project from the surface of the electrode being embedded in the interior surface of the mold so that on running the fused compound into the mold it will surround the root ends or enlarged portions of the studs, prisms, or bars which project into the capacity of the mold and on solidifying will firmly retain them in place. These studs, prisms, or bars of spongy lead may be conveniently produced by compressing into a mold any suitable form or salt of lead mixed or not with oxide of lead, or by fusing any suitable salt of lead (mixed or not with oxide of lead) and running the same into a mold of the proper shape, and then removing the mass from the mold and reducing it by contact with metallic zinc in salt and water, or by electrolysis to the state of coherent spongy lead. The fused salt of lead mixed or not with lead oxide, and whether or not they have been agglomerated in a mold without being fused and mixed with lead oxide, may be secured in the supporting-plates before being reduced, and be reduced therein to a state of spongy metallic lead.

It is evident that the active material which is secured in the electrode by casting the lead or lead compound around it may be any compound or material which will undergo chemical change in charging and resume or tend to resume its original condition upon discharging—such, for instance, as the salts or the oxide of lead above specified, or their equivalents—or I may take any other form of finely-divided lead. For instance, I may produce fine hair of metallic lead by running melted lead through a fine sieve into cold water and compress the same into the desired form. Any finely-divided lead will answer, provided that it possesses the necessary coherence and presents a large surface for chemical action.

The process for carrying out my improvements in the manufacture of secondary-battery plates will be better understood by reference to the accompanying drawings, in which—

Figure 3:
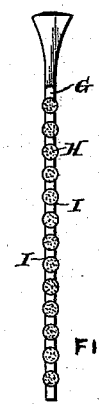
Figure 5:
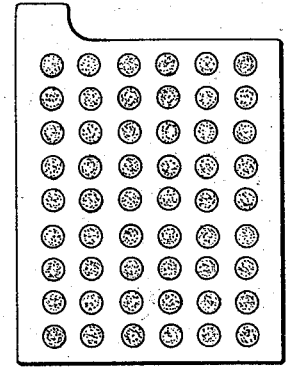
Figure 2:
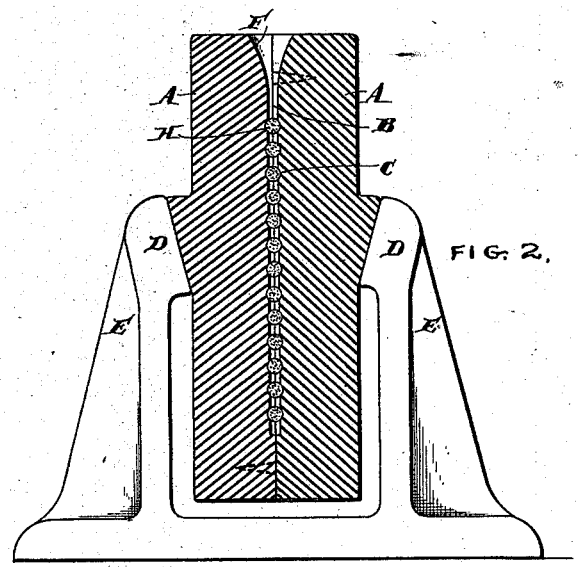
Figure 7:
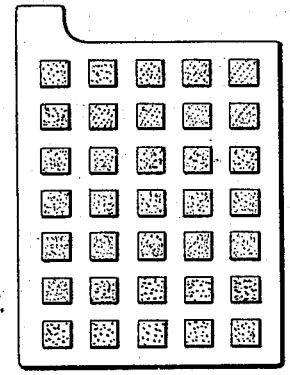
Figures 4, 6:
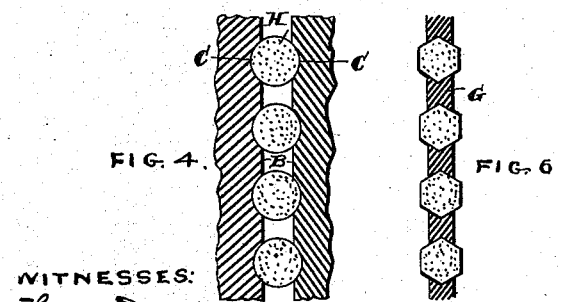
Figure 8:
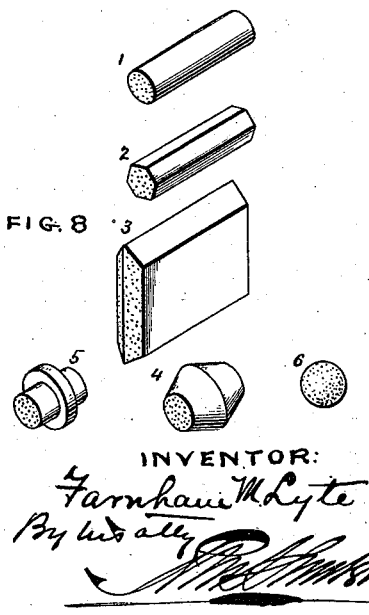

Figure 1 is a side elevation of one half of the mold with the active material in place, but with the other half of the mold removed. Fig. 2 is a vertical section on line $x\ x$, showing the mold and active material pieces ready for casting. Fig. 3 is a sectional elevation of a plate after being cast and before being trimmed. It is shown as if removed from Fig. 2. Fig. 4 is an enlarged view of a portion of Fig. 2. Figs. 5 and 7 are side elevations of modified forms of plates made by my process. Fig. 6 is a cross-section of a plate similar to Fig. 3, but with cylinders of active material of hexagonal cross-section. Fig. 8 represents perspective views of six different forms of active material suitable for carrying out my improved process.

A A are the two halves of the mold, and may be made of metal, plaster, or sand, and when these parts are placed together they form a space B of about one-eighth of an inch in thickness. The faces of the interior of the mold have recesses C of suitable shape to receive the projecting portions of the active material pieces H. (See Figs. 2 and 4.) The mold-halves may rest in a frame E and be held together by wedge-surfaces D, or in any other suitable manner. The space B opens through a casting hole or opening F at the top. The lead or alloy is poured into the mold through the opening F and fills the mold and tightly clamps the active material pieces H, covering so much of them as do not extend into the surface of the mold. When the lead plate is getting cold, it shrinks onto the active material, making good contact. The plates G, when cast, hold the active material, as shown in Figs. 3 and 5, in which it will be seen that the edges or lips I extend over or around the active material H, so as to grasp it. The active material may be of any desirable form suitable for being held when the plate or support is cast around them.

Referring to Fig. 8 we have six forms of active material, of which No. 1 is seen in Figs. 1, 2, 3, and 4, No. 2 in Fig. 6, No. 3 in Fig. 7, No. 4 or No. 5, or No. 6 in Fig. 5. No. 6 would also be substantially represented in Figs. 2, 3, 4, and 5, as it is spherical.

I do not confine myself to any form of active material, nor to the shape of the mold or the way the active material is supported in the mold, as my invention comprehends the method of casting the plate or supporting material on the active material.

Having now particularly described and ascertained the nature of the said invention, and in what manner the same is to be performed, I declare that what I claim is—

1. The method of manufacturing an electrode of a secondary battery, consisting in melting or casting the supporting material around studs, prisms, or bars of spongy or finely-divided lead having collars or projections, or of such form as to be retained in place by the supporting material, substantially as described.

2. The method of manufacturing an electrode of a secondary battery, consisting in melting or casting the supporting material around studs, prisms, bars, rods, or other suitable forms of active material.

3. The method of making a secondary-battery element or electrode, consisting in first forming studs, prisms, bars, rods, or other suitable forms of active material, then casting or molding the supporting material around said active studs, prisms, bars, rods, or other forms in such manner as to hold them and expose a portion of their surface.

4. The method of making a secondary-battery element or electrode, consisting in first forming studs, prisms, bars, rods, or other suitable forms of active material, then arranging a number of said studs, prisms, bars, rods, or other forms of active material in a predetermined order and more or less separated from each other, and finally casting or molding the supporting material around said active studs, prisms, bars, rods, or other forms in such manner as to hold them and expose a portion of their surface.

5. The method of making a secondary-battery element or electrode, consisting in first forming studs, prisms, bars, rods, or other suitable forms of active material, and then casting the supporting material around them in the form of a plate and of less thickness than the said studs, prisms, bars, rods, or other forms.

The foregoing specification of my improvements in secondary batteries or accumulators signed by me this 26th day of September, 1888.

FARNHAM MAXWELL LYTE.

Witnesses:
ALICE MAXWELL LYTE,
G. MAXWELL LYTE.